E. J. HARTER & A. J. MYERS.
APPARATUS FOR COOLING CHOCOLATE CANDY.
APPLICATION FILED JULY 15, 1910.

999,164.

Patented July 25, 1911.

Witnesses
Agnes J. Hayes
A. L. Smith

Inventors
Edward J. Harter
Alfred J. Myers
by Chas. J. Williamson
Attorney

UNITED STATES PATENT OFFICE.

EDWARD J. HARTER AND ALFRED J. MYERS, OF TIFFIN, OHIO.

APPARATUS FOR COOLING CHOCOLATE CANDY.

999,164.

Specification of Letters Patent.     Patented July 25, 1911.

Application filed July 15, 1910. Serial No. 572,223.

*To all whom it may concern:*

Be it known that we, EDWARD J. HARTER and ALFRED J. MYERS, of Tiffin, in the county of Seneca and in the State of Ohio, have invented a certain new and useful Improvement in Apparatus for Cooling Chocolate Candy, and do hereby declare that the following is a full, clear, and exact description thereof.

In the manufacture of chocolate candy, the candy is dipped into warm liquid chocolate thus giving each piece of candy a covering or coating. A temperature not greater than 72 degrees Fahrenheit has been found essential for the cooling and hardening of the chocolate coating. The ordinary practice to secure the desired cooling temperature, is to insulate the entire room where the dipping is done and to supply cool or refrigerated air to the room.

The object of our invention is to make unnecessary the employment of an insulated work room, so as to get rid of certain disadvantages, which are hereinafter pointed out, that accompany that practice, and to such end our invention consists in the apparatus constructed substantially as hereinafter specified and claimed.

Figure 1:
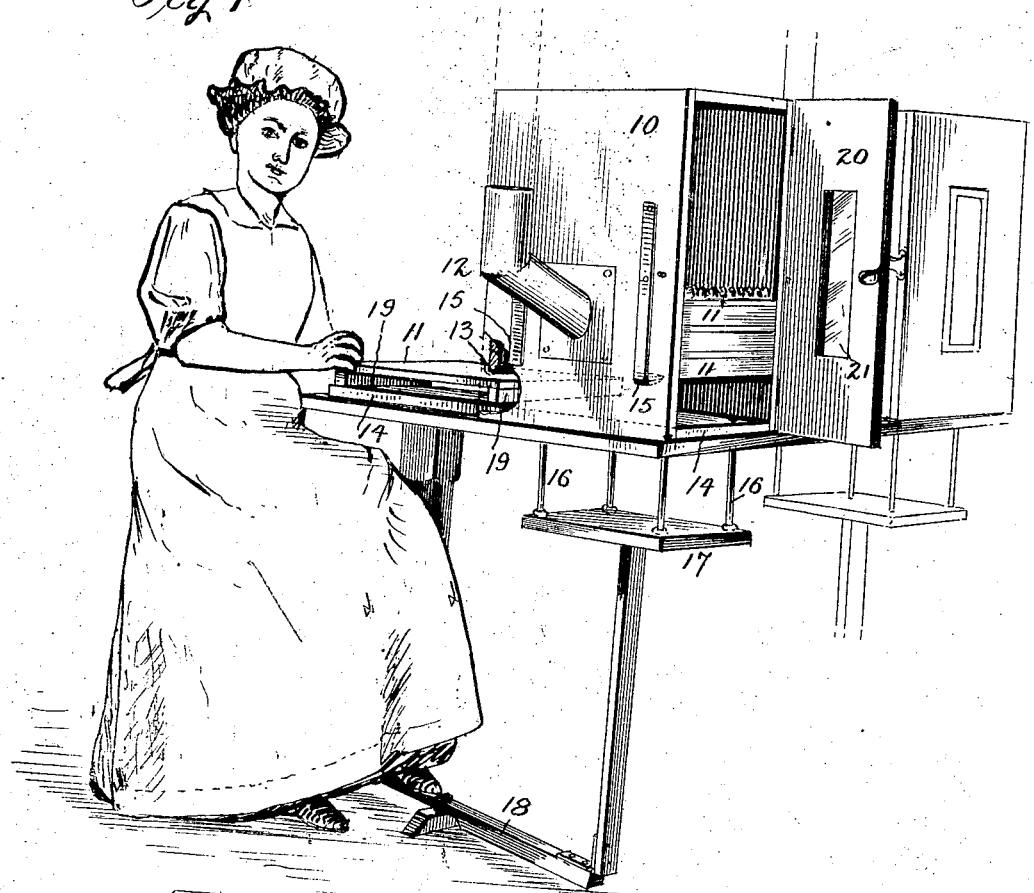
Figure 2:
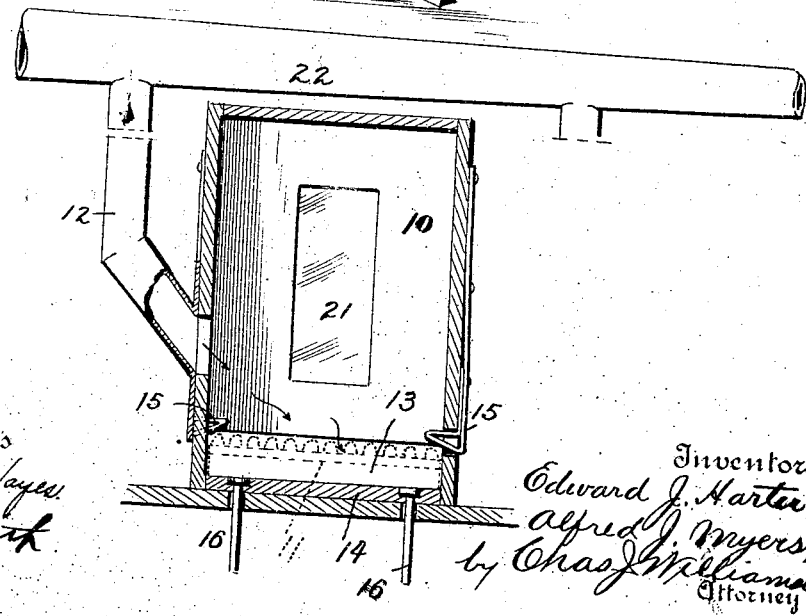

In the accompanying drawings—Figure 1 is a perspective view of an apparatus embodying our invention; and Fig. 2 a vertical section thereof.

In dipping chocolates for the convenient handling of the candy, rectangular trays are employed upon which the pieces of candy, as fast as dipped, are placed by the operative, and our invention, in the embodiment thereof as we have practiced it, is adapted or suited to the use of such trays, and in the embodiment of our invention illustrated in the drawings we employ a box-like casing 10, forming a chamber of a form and dimensions suited to receive and hold a number of the ordinary trays 11. As the casings 10 are comparatively small a number of them may be supported on the same table side by side spaced apart such distances as will afford proper room for an operative at each casing. The casing 10 is closed at top and bottom and on all four sides, excepting that an air pipe 12 opens through one of the side walls, preferably, and that there is an opening 13 in the front wall, at the bottom thereof, of a size just sufficient to permit the passage into the casing of a tray 11 with freshly dipped chocolates resting thereon. The bottom 14 of the casing 10 is prolonged at the front of the casing so as to form a convenient rest or support for the tray along which it may easily be slid into the casing chamber as row after row of freshly dipped chocolates is placed thereon or upon the sheet of paraffin paper usually applied to the top of the tray. When a tray, filled with freshly dipped chocolates, is pushed wholly within the casing 10, it is moved upward therein and supported by a pair of spring-actuated catches 15 on opposite sides of the casing, so as to make room for the next following chocolate-filled tray. For the easy and convenient lifting of the tray, as described, a number of posts 16 pass vertically through openings in the casing bottom, and below the supporting table are attached to a platen or follower 17, to which is connected a treadle 18, within convenient reach of the operative so that by the depression of the treadle the posts will be lifted and, engaging the under-side of the inserted tray, will lift it until it has been moved upward past the spring catches and engaged thereby. Any tray resting upon the spring catches will be engaged by the next following tray and lifted within the casing chamber, the trays being provided on their under-sides with foot-forming or spacing cleats 19 that protect the chocolates from damage by contact with a superimposed tray. For the convenient removal of an accumulation of chocolate-filled trays in the casing chamber, the back wall of the casing is hinged to form a door 20. Preferably glazed sight openings, or windows, 21 are provided in the front and back walls of the casing 10 to enable the interior thereof to be readily seen.

The air pipe 12 delivers air, by means of a suitable blower, from an ice plant, so that air at the requisite cooling and hardening temperature is delivered into the casing 10. A number of cooling boxes or compartments can conveniently be supplied from the same service pipe 22, to which the air pipe 12 of each casing is connected, and said service pipe is made tapering in form to assure an adequate and, as nearly as possible, a uniform supply of air to a series of cooling boxes or cases, the diameter of the service pipe decreasing from the source of supply of air thereto.

The procedure, in the use of the apparatus illustrated and described as embodying our invention, is to place a tray 11 upon the prolongation of the casing bottom with an end of the tray at the opening 13 in the front wall of the casing, so that such opening will thereby be closed except to the extent necessary to enable the freshly dipped chocolates placed on the tray to pass under the bottom edge of the front wall. The girl operative, as fast as she dips a piece of candy, will place the same on the tray at the narrow opening left, until she has placed a row entirely across the tray and then she will push the tray inward to carry the just-deposited, freshly dipped candy into the chamber. By the continuance of this operation, row after row of freshly dipped chocolates will be deposited upon the tray and successively moved into the casing, and when it is wholly therein the treadle will be operated to move the filled tray up within the casing, and tray after tray will be filled in a similar manner and moved into and lifted within the casing. All the time the operation we have just described is being carried on, air, at the desired low temperature is pouring into the casing chamber and passing out therefrom through the narrow space afforded by the opening 13 in the front wall above the tray, with the result that the freshly dipped chocolates almost instantly after being dipped are subjected to the action of cooled air, and are continuously thereafter subjected to fresh air continuously supplied until the tray containing it is removed from the compartment. By means of our invention, we have found that a five ton ice plant can be made to do the work requiring a fifteen ton plant with the method heretofore practiced of employing an insulated room; and besides this large saving of expense, since the work room does not require to be insulated, it can be adequately ventilated and thus a pleasanter and more healthful condition for the operatives maintained. Besides the advantages of economy and ventilation we have found that the product is better in its texture and appearance, because the drying and hardening of the chocolate coating proceeds faster than by the method heretofore practiced, the hastening of the cooling and hardening operation which is due to the constant supply of fresh air, preventing the cocoa butter coming to the surface in any degree. The effect of the cocoa butter coming to the surface is to give a dirty or streaked appearance to the chocolate.

While practice has shown the apparatus that we have described is an excellent embodiment of our invention admirably capable of doing satisfactory work, we, of course, do not restrict ourselves to the particular construction of apparatus illustrated and described, as our invention may be otherwise embodied.

Having thus described our invention what we claim is—

1. In an apparatus for drying and hardening the chocolate coating of candy, the combination of a casing having at its bottom an opening for the outlet of air that is constantly open, a tray support extending horizontally from said opening outward therefrom, means for supplying air continuously within said casing, and a tray adapted to pass through said opening into the casing whereby air under pressure passes over the candy on the tray while being inserted therein.

2. In an apparatus for drying and hardening the chocolate coating of candy, the combination of a casing having an opening for the introduction of candy into the chamber that is constantly open, said opening being the outlet for air whereby simultaneously with the introduction of candy into the chamber air under pressure passes therefrom through said opening, a tray support extending outward from said opening, and a pipe for the supply of air to said casing opening through a wall thereof above said opening.

In testimony that we claim the foregoing we have hereunto set our hands.

EDWARD J. HARTER.
    ALFRED J. MYERS.

Witnesses:
 RUSHTON D. NILES,
 NORMAN W. PETERS.